US011871226B2

(12) United States Patent
Maufort et al.

(10) Patent No.: US 11,871,226 B2
(45) Date of Patent: *Jan. 9, 2024

(54) METHOD AND SYSTEM FOR PROVIDING LOCATION-AWARE MULTI-FACTOR MOBILE AUTHENTICATION

(71) Applicant: JPMorgan Chase Bank, N.A., New York, NY (US)

(72) Inventors: Rocky J. Maufort, West Chester, PA (US); Edward P. A. Lawford, Ridgewood, NJ (US); Tommy Y. Cheung, Livingston, NJ (US); Paul Manaloto, Woodridge, IL (US); Matthew Murphy, Wigan (GB); Matthew E. Duncan, Dublin, OH (US); Dongtao Wang, Lewis Center, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,047

(22) Filed: Jul. 29, 2022

(65) Prior Publication Data

US 2022/0369108 A1 Nov. 17, 2022

Related U.S. Application Data

(63) Continuation of application No. 16/939,714, filed on Jul. 27, 2020, now Pat. No. 11,425,566.
(Continued)

(51) Int. Cl.
*H04W 12/06* (2021.01)
*H04W 12/00* (2021.01)
(Continued)

(52) U.S. Cl.
CPC ........ *H04W 12/068* (2021.01); *G06F 21/608* (2013.01); *G06K 19/06037* (2013.01); *H04L 63/0861* (2013.01); *H04W 12/63* (2021.01)

(58) Field of Classification Search
CPC ... H04W 12/068; H04W 12/63; G06F 21/608; G06K 19/06037; H04L 63/0861
See application file for complete search history.

(56) References Cited

U.S. PATENT DOCUMENTS 8,517,254 B1   8/2013  Cipriano
8,855,665 B2 * 10/2014  Buford .................... H04W 4/20
                                                           455/457

(Continued)

FOREIGN PATENT DOCUMENTS

WO    2018/163087 A1   9/2018

OTHER PUBLICATIONS

Notification of Transmittal of the International Search Report and the Written Opinion of the International Searching Authority issued in PCT/US20/43711, dated Oct. 15, 2020.
(Continued)

*Primary Examiner* — Phy Anh T Vu
(74) *Attorney, Agent, or Firm* — GREENBLUM & BERNSTEIN, P.L.C.

(57) ABSTRACT

A method performs location-based multi-factor authentication. The method includes a mobile device that receives a first set of authentication credentials provided by a user, and transmits the first set of authentication credentials to an authentication server, which verifies the first set of authentication credentials. The authentication server transmits verified first factor authentication to the mobile device that sends a request for second factor authentication to an authentication system, which causes the mobile device to scan identifier information associated with a secure device, the secure
(Continued)

device then sending a second set of authentication credentials to the authentication system. The authentication system verifies the second set of credentials system and transmits verified second factor authentication to the authentication server, which subsequently grants final authentication based on the verified first factor authentication and the verified second factor authentication.

20 Claims, 3 Drawing Sheets

Related U.S. Application Data

(60) Provisional application No. 62/878,532, filed on Jul. 25, 2019.

(51) Int. Cl.
*H04L 29/06* (2006.01)
*G06K 19/06* (2006.01)
*G06F 21/60* (2013.01)
*H04L 9/40* (2022.01)
*H04W 12/63* (2021.01)

(56) References Cited

U.S. PATENT DOCUMENTS

| | | | |
|---|---|---|---|
| 10,325,087 B1 | 6/2019 | Goodsitt et al. | |
| 10,657,242 B1 | 5/2020 | Xia | |
| 10,754,600 B1* | 8/2020 | Brown | G06F 3/121 |
| 2006/0077465 A1* | 4/2006 | Ball | G06K 17/00 |
| | | | 358/1.18 |
| 2008/0120698 A1 | 5/2008 | Ramina | |
| 2008/0244712 A1* | 10/2008 | Kitada | G06F 21/82 |
| | | | 726/5 |
| 2010/0098248 A1* | 4/2010 | Anantharaman | G06F 21/6218 |
| | | | 713/176 |
| 2012/0284325 A1 | 11/2012 | Erb | |
| 2013/0179692 A1 | 7/2013 | Tolba | |
| 2013/0339740 A1 | 12/2013 | Ben-Shalom | |
| 2015/0106900 A1* | 4/2015 | Pinski | H04W 12/068 |
| | | | 726/7 |
| 2015/0269370 A1 | 9/2015 | Phillips | |
| 2016/0063493 A1* | 3/2016 | Howe | G06Q 20/322 |
| | | | 705/44 |
| 2016/0105420 A1* | 4/2016 | Engan | H04W 12/068 |
| | | | 455/411 |
| 2016/0173501 A1 | 6/2016 | Brown | |
| 2016/0182529 A1* | 6/2016 | Biehl | H04W 12/08 |
| | | | 726/1 |
| 2017/0046525 A1* | 2/2017 | Balinsky | G06F 9/38 |
| 2017/0171754 A1 | 6/2017 | South | |
| 2017/0279795 A1 | 9/2017 | Redberg | |
| 2017/0346635 A1 | 11/2017 | Gummeson | |
| 2018/0041489 A1 | 2/2018 | Naranayan | |
| 2018/0121642 A1 | 5/2018 | Cooper | |
| 2018/0375659 A1 | 12/2018 | Kozma | |
| 2021/0204130 A1* | 7/2021 | Woodland | H04W 12/121 |

OTHER PUBLICATIONS

International Bureau, International Preliminary Report on Patentability, International Application No. PCT/US2020/043711, pp. 1-10, dated Feb. 3, 2022.

Extended European Search Report, dated Jul. 17, 2023, by the European Patent Office (EPO), for European Application No. EP 20 84 5132.8.

* cited by examiner

METHOD AND SYSTEM FOR PROVIDING LOCATION-AWARE MULTI-FACTOR MOBILE AUTHENTICATION

CROSS REFERENCE TO RELATED APPLICATIONS

This is a continuation of U.S. patent application Ser. No. 16/939,714, filed Jul. 27, 2020, which claims the benefit of U.S. Provisional Patent Application No. 62/878,532, filed Jul. 25, 2019. The disclosure of each of the above-identified documents, including the specification, drawings, and claims, is incorporated herein by reference in its entirety.

FIELD OF THE INVENTION

The present invention relates generally to location-aware multi-factor authentication for a mobile device.

BACKGROUND OF THE INVENTION

Many organizations deploy mobile devices (e.g., tablet, wearables, etc.) as a primary work device for their employees. The protection of customer data is paramount and, therefore, organizations need to ensure that their employees access applications with customer data in a secure manner. In addition, certain applications require that the application only be accessed at a particular location, e.g., office, bank branch, etc. Currently, some of these organizations employ multi-factor authentication in order to access such applications. However, the current multi-factor authentication solutions require that a user own the particular mobile device being utilized during the authentication as a core validation point. Accordingly, such authentication solutions cannot be implemented when the particular mobile device is not assigned to the user. In addition, for applications requiring access at particular locations, current location-based authentication solutions employ the Global Positioning System (GPS), which has been generally unreliable. For example, a GPS receiver needs time to acquire signals from GPS satellites and can take between 5-10 minutes to start working. Further, the GPS radio signals go through different air and weather conditions while travelling to the earth, which can often delay the GPS signals and, therefore, affect the accuracy of the GPS receiver. In addition, buildings, trees, tunnels, mountains, clothing, as well as the human body can cause signal obstruction and, therefore, prevent GPS signals from the satellites from reaching the receiver. In particular, signals from the GPS satellites can bounce off buildings, causing multipath errors that can confuse GPS receivers by the extra time the signal takes to reach it. For a high-rise building with many floors, GPS data would not be useful to determine user location.

Accordingly, there is a need for an authentication process which can overcome at least some of the deficiencies described herein above.

SUMMARY OF THE INVENTION

One aspect of the present disclosure relates to a wireless, touchless multi-factor mobile authentication process. According to an embodiment of the present invention, a computer implemented method comprises the steps of: receiving, at the mobile device, authentication credentials provided by a user; transmitting, with the mobile device, the authentication credentials to an authentication broker server; verifying, at the authentication broker server, the authentication credentials as a first factor of authentication; sending, via the mobile device, a request to scan an identifier associated with the user at the secure device; verifying, with a database, identification data associated with the scanned identifier based on a location of the secure device as a second factor of authentication; and configuring the mobile device based at least in part on the verification of the scanned identifier and the location of the secure device.

According to an embodiment of the present invention, a computer implemented system for authenticating a mobile device comprises: a mobile device associated with a user; an authentication broker server that verifies user authentication information; a database that manages authentication information; and an authentication system in communication with the mobile device, authentication server and database wherein the authentication system comprises a computer processor that is programmed to perform the steps of: receiving authentication credentials provided by a user; transmitting the authentication credentials to the authentication broker server; verifying, at the authentication broker server, the authentication credentials as a first factor of authentication; sending to the mobile device a request to scan an identifier associated with the user at a secure device; verifying, with a database, identification data associated with the scanned identifier based on a location of the secure device as a second factor of authentication; and configuring the mobile device based at least in part on the verification of the scanned identifier and the location of the secure device.

The present invention provides various advantages and benefits. With an embodiment of the present invention, a user's identity and location, as well as the particular location of a corresponding mobile device, may be accurately verified using a multi-factor authentication. With an embodiment of the present invention, the mobile device may be securely activated in the particular location and only by a designated user in that location. Further, the user's identity may be bound to the mobile device in the particular location. Accordingly, the embodiments of the present invention provide a higher level of accuracy and precision when compared to GPS and current solutions.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE INVENTION

Figure 1:
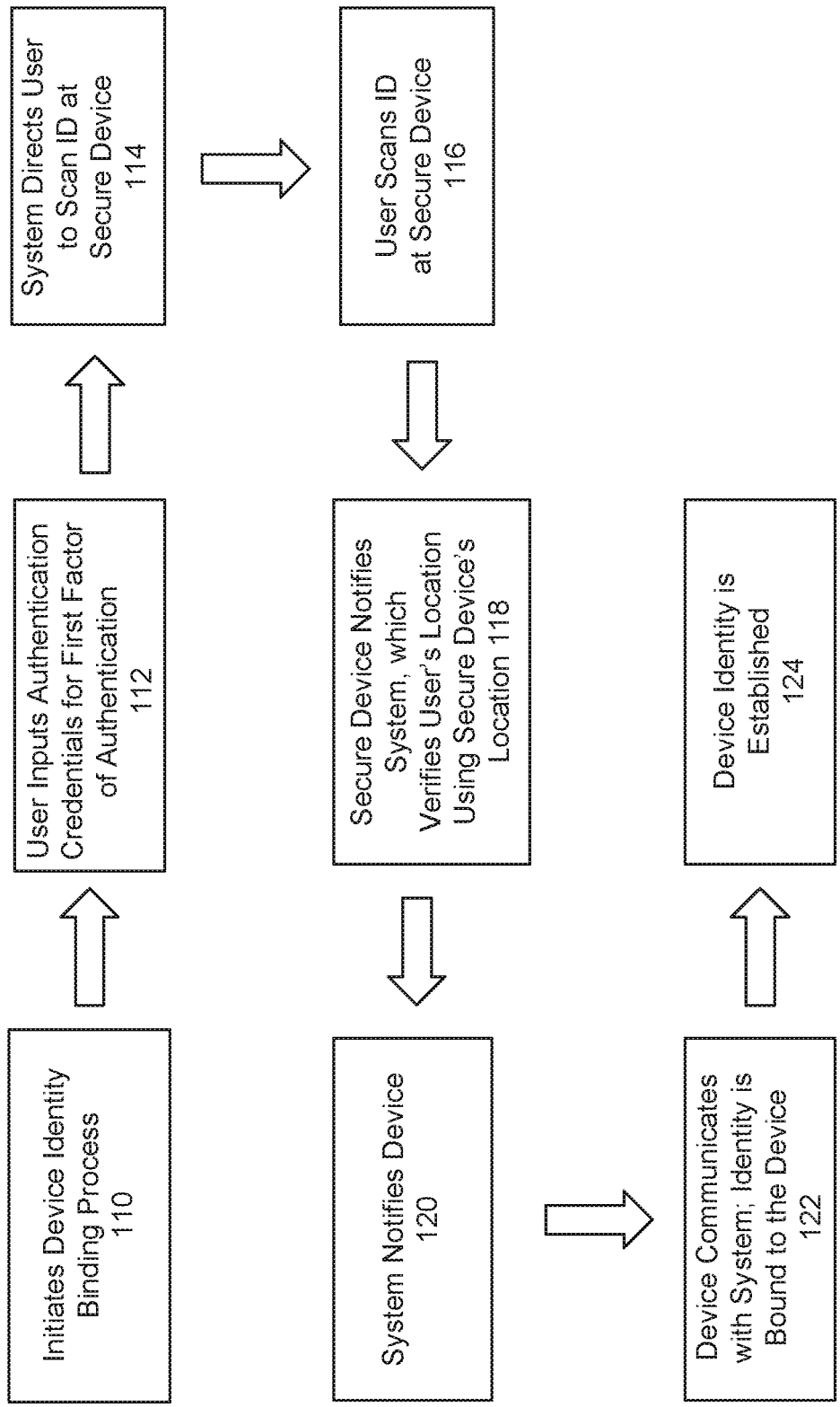
FIG. 1 is an exemplary flow diagram for location-based multi-factor authentication, according to an embodiment of the present invention.

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to a wireless touchless multi-factor mobile authentication. An embodiment of the present invention provides a first level of authentication for a user and a mobile device and then a second level of authentication with a secure device associated with a specific location. An embodiment of the present invention leverages a secure device, such as a Multi-Function-Device (MFD), within a location. For example, a secure device may be a MFD printer that is located in a branch location. The secure device may be in physically secured (e.g., behind locked doors). For example, the secure device may be located in a restricted area that cannot be accessed without permission and generally not accessible by the public. In addition, the secure device may be network connected to a company's intranet, have a user interface (e.g., touch screen), and a customizable operating system. According to an embodiment of the present invention, the MFDs may be used in presenting the second factor of authentication as a code (e.g., QR or bar code) where the code serves as a validation point of where a user is on a trusted device (e.g., MFD, printer, etc.).

An exemplary scenario may involve a user accessing a shared wireless device (e.g., tablet, wearable, mobile device, etc.). The user may input a user name and passcode for a first factor of authentication. This may occur via a Single Sign-On (SSO). The passcode may be a password, PIN, biometric authentication or other type of authentication. The first factor of authentication may then trigger a request for a second factor authentication to validate the user and where the user is located. The second factor of authentication may involve a secure device, such as a MFD, that is associated with a particular location, such as a local branch. The user may use an issued identifier, such as a company badge, to interact with the MFD (e.g., tap the printer) thereby authenticating the user and asserting that the user is in the location, e.g., a local branch. The MFD may then challenge a centralized ID Provider (IDP) to validate the user, and if validated send a code (e.g., QR code) to the screen associated with the MFD. The user may use the mobile device's camera to scan the code (e.g., QR code) which may then allow a time boxed ID certificate on the device providing access to secure applications. The access may be restricted to while the user is located within the local branch or other identified location. Other access restrictions may be applied.

Through the course of the day, authentication (e.g., biometric authentication, etc.) may be used to seamlessly re-assert identity, providing the time boxed certificate provided is still valid. Thus, an embodiment of the present invention allows frictionless MFA identity management throughout the day and further allows multifactor authentication within a location on mobile devices, asserting location without using GPS and without having to continually provide PINs and complex passwords. Accordingly, an embodiment of the present invention extends the use of a secure networked MFDs (e.g., printer) into the workflow of location based MFA for wireless devices. Depending on level of security, authentication may occur once a day or multiple times a day. For example, if the user has access to highly sensitive data, authentication may be re-asserted every hour. In another example, a user may re-assert authentication once a day. Other variations may be applied based on other conditions, factors, risks and/or data sensitivity levels.

An embodiment of the present invention enables a user to assert that they are in a specific location without having to access a computer or other hardware device. By leveraging a secure device, such as a printer, kiosk, or terminal, an embodiment of the present invention is able to securely and efficiently provide multi-factor authentication.

An embodiment of the present invention may implement secondary factors presented to the secure device. For example, secondary factors may include additional attributes evaluated during a secondary factor evaluation. This may involve evaluating the time of day the secondary factor is presented against a user's expected schedule (e.g., work schedule, vacation schedule, etc.) to determine if the user is expected at a particular location. This may further involve validating the user's secondary factor against the device's location and a physical security system to verify that the user in question is permitted to be in the physical location where the secondary factor is being presented. Another example may include validating attributes of the secure device (e.g., MFD, printer, etc.) to establish, validate and/or authenticate the secure device's identity prior to accepting and/or evaluating the user's secondary factor.

FIG. 1 is an exemplary flow diagram for location-based multi-factor authentication, according to an embodiment of the present invention. At step 110, a user may receive a mobile device and initiate a device identity binding process. At step 112, the user may input authentication credentials for a first factor of authentication. At step 114, the system may direct the user to scan an identifier (ID), such as a badge, at a secure device. At step 116, a user may scan an identifier at the secure device. At step 118, the secure device may notify the system which may then verify the user's location using the secure device's location. At step 120, the system may notify the device. This may include providing a verification notification. At step 122, the device may communicate with the system where the identity is now bound to the device. At step 124, the device identity may be established. FIG. 1 is an exemplary flowchart, according to an embodiment of the present invention. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

As shown in FIG. 1, a user may initiate a device identity binding process after receiving a shared (e.g., non-assigned) wireless mobile device at step 110. This device may include tablet, mobile phone, personal digital device, wearable, etc. As shown by step 112, a binding process may involve a first factor of authentication. The first factor of authentication may include the user inputting their authentication credentials (e.g., username and password, PIN, passcode, biometrics, etc.) into an application on the mobile device. For example, the authentication credentials may be input via Single Sign-On (SSO), which permits users to access a number of different types of applications with a single username and password. According to an embodiment, the authentication credentials may include a biometric authentication, e.g., facial recognition, fingerprint reader, voice, etc. Other forms of authentication may be applied.

After the first factor of authentication, an authentication system may direct the user to undergo a second factor of authentication to validate the particular user and their location. The second factor of authentication may involve the user scanning a physical user identification at a secure device at the particular location, at step 114. For example, if the user is a bank employee, the second factor of authentication may include the user scanning their badge at a secure device (e.g., printer, MFD, etc.) located at the bank branch. The secure device may be located in an area that restricts users from gaining access without obtaining permission. Further, electronic door access controls may be implemented in order to provide a variety of security access or egress levels to control the movement of users to and from higher than normal risk areas of a location. Further, according to an embodiment, the secure device may be fixedly attached to a physically-secure location. In other words, the secure device cannot be freely moved from that location. Examples of such secure devices include multi-function-device printers (MFP) within the bank branch, usually found in physically-secure locations (e.g., behind locked doors). Secure devices may include terminals, kiosks as well as other devices affixed to or associated with a secure location. Another example may be a secure device that is associated with a location. This may also include a desk, furniture, or other fixture with a processor and/or sensor. In yet another example, a secure device may be a vehicle that has a specific location at any point in time. In this example, a department may issue a tablet to a user so that the tablet may be assigned to a vehicle. Here, the user may scan an identifier (e.g., badge) at the vehicle so that the tablet is associated with the vehicle and the vehicle's location. Other variations of secure devices may be applied. The bank branch application is merely one exemplary scenario; the various embodiments of the present invention may be applied to different applications, environments, and scenarios.

After the physical identification is scanned at the secure device at step 116, the secure device may send a request to the authentication system to verify the user and their location at step 118. In particular, the authentication system may determine if the user is physically located in an immediate proximity of the secure device. After verifying the user and their location, the authentication system may then notify the mobile device of the successful verification, at step 120. The mobile device may interact with authentication system to bind the identity of the user to the mobile device, as shown by 122 and 124.

Figure 2:
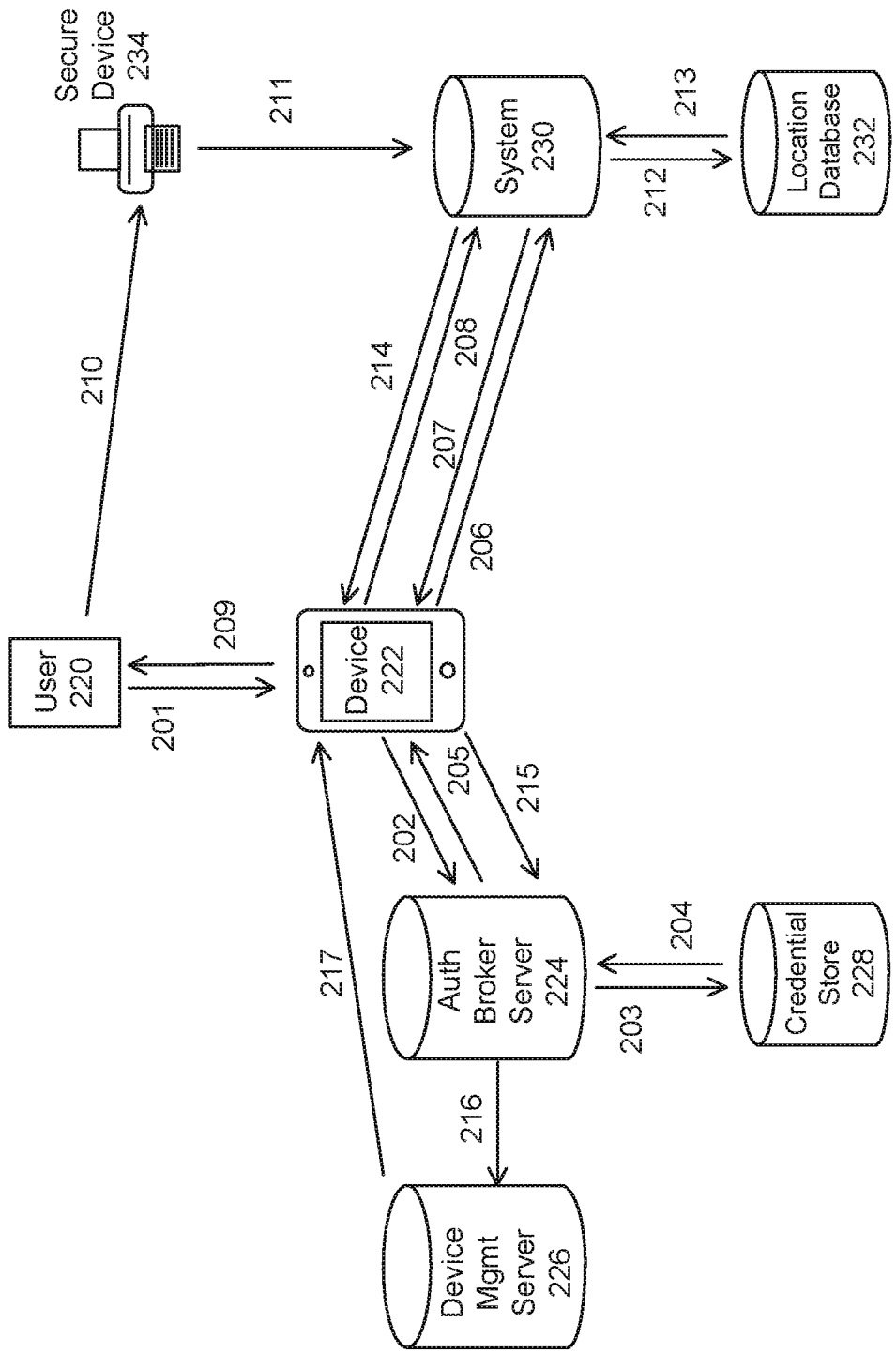
FIG. 2 illustrates an exemplary system diagram illustrating location-based multi-factor authentication, according to an embodiment of the present invention.

FIG. 2 illustrates an exemplary system diagram illustrating location-based multi-factor authentication, according to an embodiment of the present invention. FIG. 2 illustrates a multi-factor identity binding process. User 220 may be associated with a mobile device that executes an application, as shown by 222. The mobile device may represent a mobile phone, tablet, wearable and/or other device with processing capabilities. The system for authenticating a mobile device may include Authentication Broker Server 224, Device Management Server 226, Credential Store 228, System 230, Location Database 232 and Secure Device 234.

FIG. 2 further illustrates interactions between the various components in the system. User 220 may initiate an authentication process using a mobile device 222, via step 201. Mobile Device 222 may execute an application (App) that receives user credentials from the user and sends credentials to Authentication Broker Server 224, via step 202. Authentication Broker Server 224 may verify user credentials through Credential Store 228. Credential Store 228 may also leverage a directory service to confirm credentials and other user information. Upon verification, Credential Store 228 may send a response to Authentication Broker Server 224, which then confirms authentication to Device 222, via 205. Device 222 may then send a request for second factor verification to System 230, via 206.

Via 207, System 230 may send instructions to identifier scan to Device 222. Via 208, Device 222 may check System 230 for authentication, and wait for a response from System 230. Device 222 may prompt the user to scan, via 209. In response, the user may scan an identifier (e.g., badge, token, card, key, etc.) at Secure Device 234, via 210. Secure Device 234 may send a second set of credentials, which may contain identifier information and location information of Secure Device 234 to System 230, via 211. System 230 may verify the location associated with Secure Device 234 with location data stored and managed at Location Database 232, via 212 and 213. Location verification may be conveyed from System 230 to Device 222, via 214, which may be further communicated to Authentication Broker Server 224, via 215. Step 214 may be considered the response for request 208. Authentication Broker Server 224 may grant final authentication and send verification information to Device Management Server 226, via 216. Device Management Server 226 may send commands and configurations to Device 222 to allow device checkout, via 217.

According to an embodiment of the present invention, Authentication Broker Server 224 may manage communications between Device Management Server 226, Credential Store 228, and Device 222. For example, Authentication Broker Server 224 may manage the credential information being transmitted between Device 222 and Credential Store 228. In addition, Credential Store 228 may store and manage a list of the identification credentials allowed to access the secure applications. Further, Authentication Broker Server 224 may also manage the mobile device configuration information communications between Device 222 and Device Management Server 226. According to an embodiment of the present invention, Device Management Server 226 may represent at least one of a mobile device management (MDM) and an enterprise mobility management (EMM) system. As such, Device Management Server 226 may ensure that certain security and authentication policies are enforced in the mobile device. Authentication Broker Server 224, Device Management Server 226, and Credential Store 228 may be implemented in at least one computer processor or server.

Further, System 230 may manage interactions between Device 222, Secure Device 234 (e.g., MFP, etc.), and Location Database 232. Other examples of secure devices may include interactive kiosks, terminals (e.g., ATMs) with an incorporated RFID sensor (or other proximity sensors) for scanning badges or other physical IDs. Further, Location Database 232 may include user and secure device information. For example, Location Database 232 may include information about the location of the particular secure device. In this regard, Location Database 232 may include IP address information, physical coordinates and/or other location data associated with the secure device. For example, the physical coordinates may be determined via wired networking (e.g., routing) information. Further, Location Database 232 and System 230 may be implemented via at least one computer processor or server.

The system of FIG. 2 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 are depicted, it should be appreciated that other connections and relationships are possible. The system 200 described below may be used to implement the various methods herein, by way of example. Various elements of the system 200 may be referenced in explaining the exemplary methods described herein.

Figure 3:
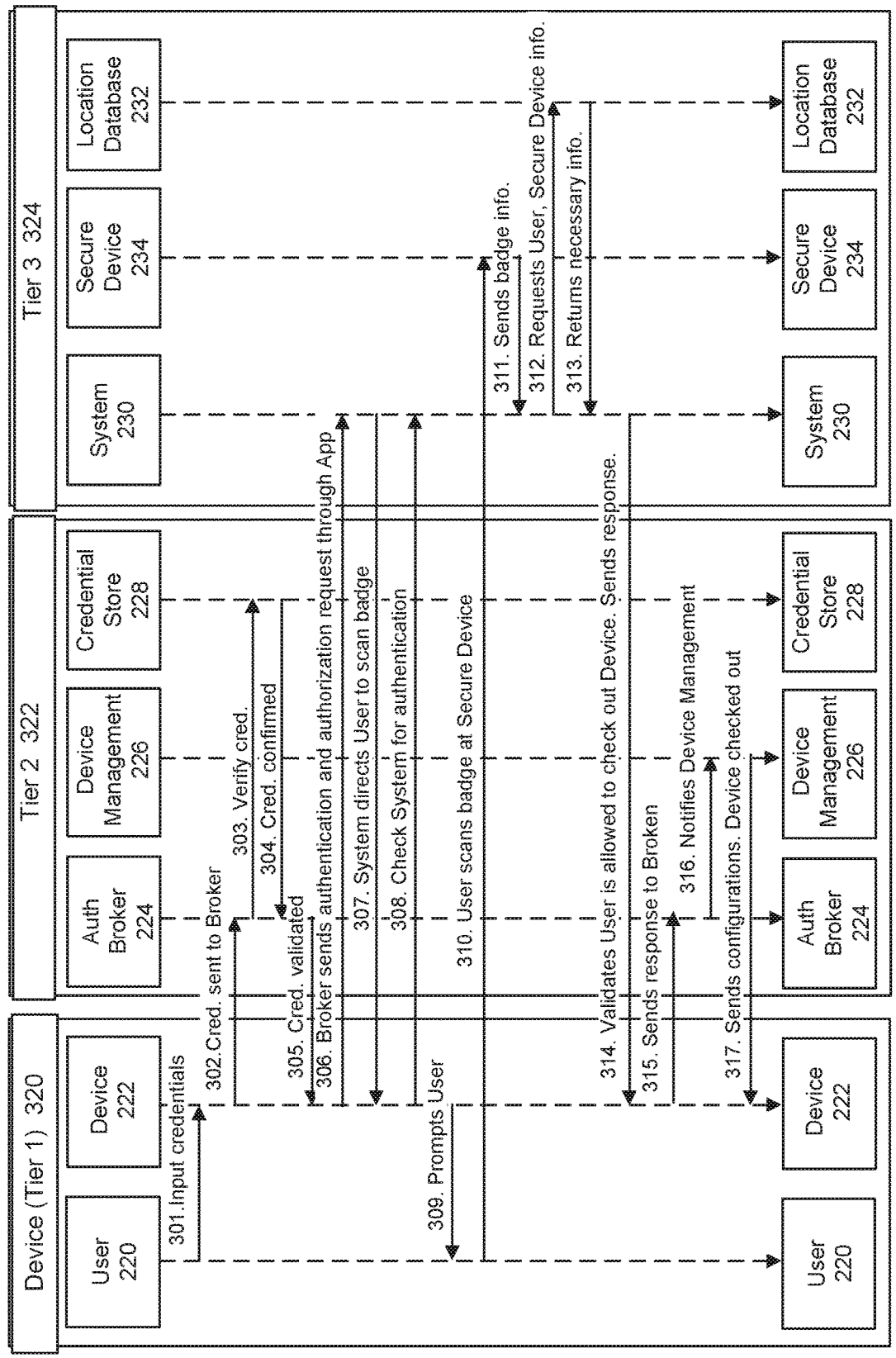
FIG. 3 illustrates flow interaction between system components, according to an embodiment of the present invention.

FIG. 3 illustrates flow interaction between system components, according to an embodiment of the present invention. Tier 1 devices 320 may include User 220 and Device 222. Tier 2 322 may include Authentication Broker Server 224, Device Management Server 226 and Credential Store 228. And, Tier 3 324 may include System 230, Secure Device 234 and Location Database 232.

As shown in FIG. 3, in step 301, a user may enter their authentication credentials (e.g., username and password) into the mobile device through an application. For example, the authentication credentials may include a biometric authentication, e.g., facial recognition, fingerprint reader, etc. At step 302, the mobile device may provide the entered authentication credentials to authentication broker server. At step 303, authentication broker server may provide the authentication credentials to credential store for verification. According to an exemplary embodiment, authentication broker server may verify the authentication credentials by comparing the authentication credentials to a list of allowed identification credentials stored and managed in credential store. After verification, the entered authentication credentials may be confirmed against the stored list managed at credential store. Then, the credential store may provide an indication of the confirmation to authentication broker server, as shown at step 304. Then, at step 305, authentication broker server may provide the confirmation indication to mobile device. This is to conclude the success of first factor authentication At step 306, the mobile device may start the second factor authentication by sending an authentication and authorization request, e.g., a Security Assertion Markup Language (SAML), OpenID, or OAuth2 request, to the authentication system through the application. In response, the authentication system may notify the user, via the mobile device, to scan a physical user identifier at the secure device (e.g., MFP) as shown at step 307. At step 308, the mobile device may check the authentication system for authentication of the user and session before prompting the user to scan the physical user identification at the secure device. For example, the mobile device may use SSO to validate that the user and session are authenticated. While waiting for response from the authentication system, the mobile device may prompt the user to scan the physical user identification at the secure device as shown at step 309. In response, the user may scan the badge at step 310.

Then, at step 311, the secure device may send information extracted from the physical user identifier to the authentication system. The authentication system may then request user and secure device information from the location database as shown at step 312. For example, the authentication systems may request information about the location of particular secure device. Then, at step 313, the location database may provide the requested information to the authentication system.

At step 314, the authentication system may validate that the location information of secure device matches the location information of user, then user is allowed to check out the mobile device and provide the notification of such validation to the mobile device. For example, the authentication system may confirm that the physical user identification was scanned at a location associated with the secure device. Then, at step 315, the mobile device may provide the confirmation notification to the authentication broker, which may then grant final authentication and provide the notification to the device management server as shown at step 316. At step 317, the device management server may then provide the configuration information for assigning the mobile device to the mobile device, which may then configure the mobile device so that it is assigned to a particular user.

According to an embodiment of the present invention, if verification fails after either step 303 or step 314, then the user may be prevented from accessing the mobile device beyond the application.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module. For example, appropriate encryption/decryption method may be used for communication between Secure Device and Authentication System.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for performing location-based multi-factor authentication, the method comprising:
    receiving, at a mobile device, a first set of authentication credentials provided by a user;
    transmitting, by the mobile device, the first set of authentication credentials to an authentication server;
    verifying the first set of authentication credentials by the authentication server accessing stored credential information;
    transmitting, by the authentication server, verified first factor authentication to the mobile device;
    transmitting, by the mobile device, a request for second factor authentication to an authentication system;
    scanning, by the mobile device, identifier information associated with a secure device in response to instructions received by the mobile device from the authentication system;
    sending a second set of authentication credentials from the secure device to the authentication system;
    verifying the second set of credentials by the authentication system accessing a secure device location database;
    transmitting, by the authentication system, verified second factor authentication to the mobile device in response to the request for the second factor authentication;
    transmitting the verified second factor authentication to the authentication server by the mobile device after receiving both the first verified first factor authentication and the verified second factor authentication; and
    granting final authentication, by the authentication server, based on the verified first factor authentication and the verified second factor authentication.

2. The method of claim 1 further comprising:
    sending, by the authentication server, the granted final authentication to a management server that sends commands to the mobile device granting access to the user to access the secure device.

3. The method of claim 2,
    wherein the secure device is located at a physically-secure location.

4. The method of claim 1,
    wherein the secure device is a Multi-Function-Device (MFD).

5. The method of claim 1,
    wherein the first set of authentication credential includes a user name and a password.

6. The method of claim 1,
    wherein the first set of authentication credentials includes a user name and biometric information associated with the user.

7. The method of claim 6,
    wherein the biometric information includes facial recognition.

8. The method of claim 1,
    wherein the second set of authentication credentials includes the identifier information and location information of the secure device.

9. The method of claim 1,
    wherein the secure device includes a user-interactive terminal.

10. The method of claim 9, wherein the user-interactive terminal includes a proximity sensor.

11. The method of claim 1,
    wherein the secure location database includes location information of the secure device.

12. The method of claim 1,
    wherein when the first set of authentication credentials cannot be verified by the authentication server, the first factor authentication terminates and the request for the second factor authentication is not transmitted.

13. The method of claim 12,
    wherein when the second set of authentication credentials cannot be verified by the authentication system, the second factor authentication terminates and the final authentication is not granted.

14. The method of claim 1,
    wherein the granted final authentication is limited to a predetermined time period.

15. The method of claim 1,
    wherein the granted final authentication is limited to the user being within a predetermined area after the user accesses the secure device.

16. The method of claim 1,
    wherein the secure device is a printer.

17. The method of claim 1,
wherein the secure device is a vehicle.

18. The method of claim 17,
wherein the mobile device is an electronic tablet assigned to the user by an owner of the vehicle.

19. A system for performing location-based multi-factor authentication, the method comprising:
- a mobile device that receives a first set of authentication credentials provided by a user;
- an authentication server that receives the first set of authentication credentials transmitted from the mobile device, verifies the first set of authentication credentials by accessing stored credential information, and transmits the verified first factor authentication to the mobile device;
- an authentication system that sends instructions to the mobile device; and
- a secure device, including identifier information that is scanned by the mobile device in response to instructions sent from the authentication system, that sends a second set of authentication credentials from the secure device to the authentication system,
- wherein the authentication system verifies the second set of credentials by the accessing a secure device location database, and transmits verified second factor authentication to the mobile device in response to the request for the second factor authentication,
- wherein the mobile device transmits the verified second factor authentication to the authentication server after the mobile device receives both the verified first factor authentication and the verified second factor authentication, and
- wherein the authentication server grants final authentication, based on the verified first factor authentication and the verified second factor authentication.

20. The system of claim 19,
wherein the authentication server sends the granted final authentication to a management server that sends commands to the mobile device granting access to the user to access the secure device.

* * * * *